April 24, 1962 S. W. SHAW 3,031,216
KEY
Filed Feb. 7, 1961
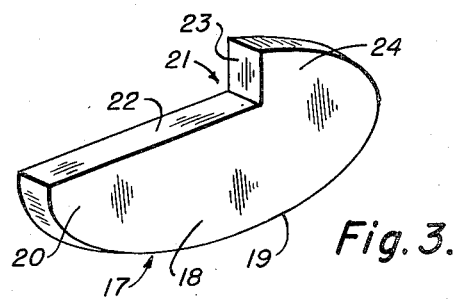
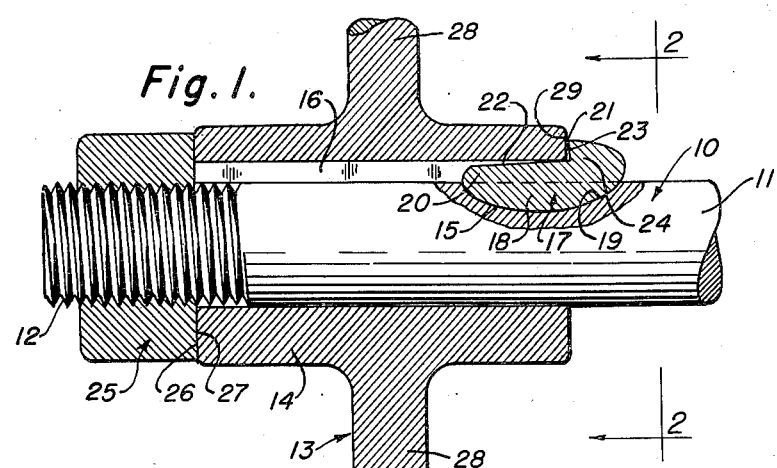
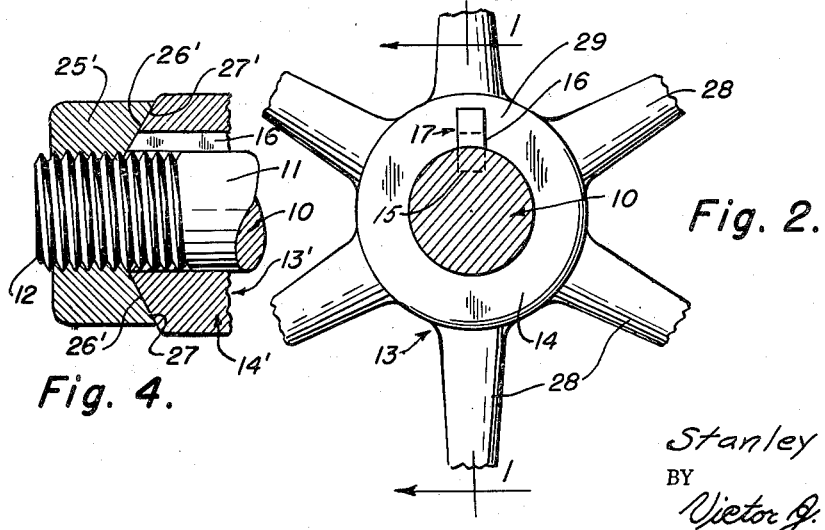
INVENTOR.
Stanley W. Shaw.
BY
Victor J. Evans &Co.
ATTORNEYS.

United States Patent Office
3,031,216
Patented Apr. 24, 1962

3,031,216
KEY
Stanley W. Shaw, P.O. Box D, Galesburg, Kans.
Filed Feb. 7, 1961, Ser. No. 87,633
4 Claims. (Cl. 287—52.05)

The present invention relates to a fastening construction, and more particularly to an improved key for fastening a member such as a wheel hub onto a shaft or axle.

The primary object of this invention therefore, is to provide an improved key and keyway construction which insures that a wheel or other member can be securely locked or fastened on or near the end of the shaft so that for example traction wheels can be securely fastened on garden tractors, riding rotary mowers or the like.

A further object is to provide an improved key of the type stated wherein there is provided a nut or fastener which, when tightened, pushes the hub against a shoulder on the key so as to tend to rock the key in order to cause the other end of the key to push against the hub whereby the hub and shaft will be tightened together.

A still further object of the present invention is to provide a shouldered key which may utilize a tapered hub and a tapered matching nut so that under certain conditions such a construction may be utilized as for example when the hub is quite long, and wherein the tapered construction will help keep the hub from shaking on a shaft in the event that there is a loose fit between the hub and shaft.

A further object is to provide a key of the type stated that will effectively hold wheels and the like securely in place without working loose, and wherein the key can be utilized speedily and with precision by even inexperienced operators to accomplish the desired results.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is a fragmentary elevational view with parts broken away and in section, illustrating the present invention.

FIGURE 2 is a sectional view taken on the line 2—2 of FIGURE 1.

FIGURE 3 is a perspective view of the improved key of the present invention.

FIGURE 4 is a fragmentary sectional view illustrating a modification.

Referring in detail to the drawings, and more particularly to FIGURES 1, 2 and 3 of the drawings, the numeral 10 indicates a portion of a shaft or axle which may include a smooth portion 11 as well as a threaded end 12, and the numeral 13 indicates a member such as a wheel which has a hub 14 mounted on the shaft 10 as shown in the drawings. The hub 14 is provided with an elongated or longitudinally extending groove 16 which is adapted to be arranged in alignment with an arcuate recess 15 in the shaft 10 as for example as shown in FIGURE 1.

According to the present invention there is provided an improved key which is indicated generally by the numeral 17, and the key 17 of the present invention includes a main body portion 18 that is provided with an arcuate edge 19 for feeding in the recess 15 in the shaft 10. As shown in FIGURE 3 for example, the key 17 also includes an end portion 20 which is adapted to be received in the groove 16 of the hub 14, and the key 17 is provided with a recess or cutout 21 which defines surfaces 22 and 23 that are arranged at right angles with respect to each other so that there is provided or defined in the key a shoulder 24. The shoulder 24 is adapted to be engaged by one end of the hub 14 as shown in FIGURE 1.

The numeral 25 indicates a fastener or nut which is arranged in threaded engagement with the threaded end 12 of the shaft 10, and the nut 25 may have a flat surface 26 which abuts an adjacent flat surface 27 on the hub 14.

Referring to FIGURE 4 of the drawings there is illustrated a modification wherein the nut 25' has a tapered surface 26' for coaction with and engagement with a corresponding tapered or beveled surface 27' on a hub 14' which may form part of a modified wheel or member 13'.

The wheel 13 may have any suitable construction, as for example the wheel 13 may be provided with radially disposed spokes 28.

From the foregoing, it is apparent that there has been provided an improved key construction which is adapted to be used for securely locking a member such as a wheel hub onto a shaft, axle, or the like. In use, with the parts arranged as shown in the drawings, the key 17 is adapted to be arranged so that its arcuate edge 19 is engaged or seated in the recess 15 of the shaft 10, and the hub 14 of the wheel 13 is adapted to be positioned or located so that its groove 16 is in alignment with the recess 15 whereby a portion such as a portion 20 of the key 17 will be snugly received in the groove 16 whereby the wheel 13 and shaft 10 will be locked together. Thus, the wheel and shaft will rotate in unison. The fastener or nut 25 is adapted to be threaded on the end portion 12 of the shaft 10, and by tightening the fastener 25, pressure will be exerted between the surfaces 26 and 27 which may be flat as shown in FIGURE 1, whereby the end portion 29 of the hub 14 will bear against or abut the surface 23 of the shoulder 24 so as to firmly lock the key 17 in place whereby the wheel and shaft will be maintained connected together. As the nut 25 is tightened, the end portion 29 of the hub 14 will have a tendency to press against the shoulder 24 so as to tend to rock the key 17 in a clockwise direction, FIGURE 1. This action will tend to better lock the key 17 in place so that accidental displacement or disengagement of the key will be prevented. In FIGURE 1 the adjacent or abutting surfaces 26 and 27 of the fastener and hub are flat. In FIGURE 4 there is illustrated a modification wherein the nut 25' has an inwardly tapered surface 26' for snugly receiving or engaging a corresponding bevel or tapered surface 27' on the hub 14' so that the tapered surfaces 26' and 27' are adapted to be used in lieu of or instead of the flat surfaces 26 and 27. In the modification of FIGURE 4 a key 17 is adapted to be used in the same manner as previously described in connection with FIGURES 1, 2 and 3.

The parts can be made of any suitable material and in different shapes or sizes.

It is to be noted that the key 17 includes the recess 21 which provides the elongated surface 22 which provides an elongated bearing surface along the edge 22 which helps insure that the key will have the desired strength to accomplish the desired results or purposes. The shoulder 24 is such that when the nut is tightened, the end portion 29 will abut the shoulder of the key so that the shoulder will function as a positive stop for preventing the hub from moving beyond its proper location on the shaft, and in addition this construction is such that as the nut is tightened, the key will have a tendency to be further and more securely locked in place.

The coacting tapered surfaces 26' and 27' help insure that the hub will be properly aligned and centered on the shaft.

It is to be noted that with the present invention the key has the shoulder thereon and this shoulder when engaged by the hub of the wheel, will rock the key in order to tighten the entire assembly against movement so that the loose fitting key will be eliminated.

In the modification of FIGURE 4 the hub 14' has the tapered surface 27' for coaction with the tapered surface 26' of the nut 25'. Thus, on constructions where the hub is quite long it is sometimes advisable in certain conditions to use such a tapered hub and nut to match. The tapered construction will help keep the hub from shaking on a shaft in case it fits rather loosely.

The primary object of the present invention therefore is to provide an inexpensive means for securely fastening a wheel or other member on or near the end of a shaft, and the present invention is especially suitable for holding traction wheels securely on garden tractors, riding rotary mowers or the like. It is to be noted that when the nut is tightened, it pushes the hub against the shoulder of the key which tends to rock the key and this causes the other end of the key to push against the hub so as to tend to tighten the hub and shaft together. The present invention is an improvement on the Woodruff type of key. The key will hold wheels or the like securely in place without working loose.

Minor changes in shape, size and rearrangement of details coming within the field of invention claimed may be resorted to in actual practice, if desired.

What is claimed is:

1. In a device of the character described, a shaft including a smooth portion having an arcuate keyway therein, and said shaft further including a threaded end, a hub mounted on said shaft and said hub being provided with a longitudinally extending groove, a key including a main body portion having an arcuate edge engaging the keyway in said shaft, an end portion of said key being received in the groove in said hub, there being a recess in said key which provides edges that are arranged at right angles with respect to each other, and said recess providing and defining a shoulder on said key for engaging one end of said hub, and a fastener arranged in threaded engagement with the threaded end of said shaft and said fastener engaging the opposite end of the hub from said shoulder.

2. The structure as defined in claim 1 wherein the abutting surfaces of the fastener and hub are flat.

3. The structure as defined in claim 1 wherein the abutting surfaces of the fastener and hub are tapered.

4. A device of the character described comprising a shaft provided with an arcuate recess, a member mounted on said shaft and said member being provided with an elongated groove therein which is aligned with said recess, a key having an arcuate edge portion engaging said recess, and a portion of said key being arranged in engagement with said groove, a shoulder on said key engaged by one end of said member, and a fastener on said shaft engaging the opposite end of the member from said shoulder.

References Cited in the file of this patent

UNITED STATES PATENTS

| 1,426,898 | Mossberg | Aug. 22, 1922 |
| 2,328,328 | Curtis | Aug. 31, 1943 |
| 2,335,744 | Curtis | Nov. 30, 1943 |
| 2,973,979 | Musser | Mar. 7, 1961 |

FOREIGN PATENTS

| 303,009 | Switzerland | Jan. 17, 1955 |